June 23, 1970   H. D. COBURN ET AL   3,516,510
SEISMIC WAVE GENERATING SYSTEM
Filed Dec. 20, 1967   4 Sheets-Sheet 1

INVENTORS
HERBERT D. COBURN
ROY C. JOHNSTON
GILBERT H. KELLY

*Jerry W. Mills*
ATTORNEY

INVENTORS
HERBERT D. COBURN
ROY C. JOHNSTON
GILBERT H. KELLY

Jerry W. Mills
ATTORNEY

INVENTORS
HERBERT D. COBURN
ROY C. JOHNSTON
GILBERT H. KELLY

ATTORNEY

INVENTORS
HERBERT D. COBURN
ROY C. JOHNSTON
GILBERT H. KELLY

United States Patent Office 3,516,510
Patented June 23, 1970

3,516,510
SEISMIC WAVE GENERATING SYSTEM
Herbert D. Coburn, Dallas, Roy C. Johnston, Richardson, and Gilbert H. Kelly, Irving, Tex., assignors to Texas Instruments Incorporated, Dallas, Tex., a corporation of Delaware
Filed Dec. 20, 1967, Ser. No. 692,070
Int. Cl. G01v *1/14, 1/00, 9/00*
U.S. Cl. 181—.5                             13 Claims

ABSTRACT OF THE DISCLOSURE

A seismic wave generator is operated by the action of fluid which exhibits viscosity variations upon the application of electrostatic fields. Electric-field valves are disposed between a pressurized source of the fluid and the seismic wave generator to selectively vary the flow paths of the fluid by varying the fluid viscosity with electrostatic fields.

---

This invention relates to seismic wave generators, and more particularly to seismic wave generators which are driven by field responsive fluid.

It is a common practice in seismic exploration to generate continuous seismic waves from a mobile unit and to detect reflections of the waves for development of records which display characteristics of the underground strata. The generation of these seismic waves is of extreme importance in that the quality of the recorded data is often dependent upon the strength, waveform and the frequency of the generated waves. Because the exploration of different types of underground strata requires different generated waveforms, it would for instance be desirable for a seismic wave generator to have the capability of generating seismic signals of frequencies ranging from above zero to approximately 100 cycles per second with a controllable output power response.

The most practical systems for accomplishing this result in land-based exploration have included the placement of a heavy vibrating plate member on the ground. In the case of marine seismic exploration, relatively good results have been obtained by vibrating a diaphragm under water. The vibrating plate members and diaphragms have been heretofore driven by various conventional power sources, such as an electric motor as described and disclosed in U.S. Pat. 2,558,089, issued June 26, 1951. The use of conventional motors of all types to drive seismic vibrators has been found to produce relatively large amplitude signals in certain limited frequency ranges, but has not generally provided high energy outputs over a broad frequency range. In addition, maintenance problems frequently arise in the use of conventional motors, due to wear and fatigue of the many moving parts of the motors.

The seismic exploration industry has thus generally turned to the use of hydraulic systems to actuate vibratory seismic wave generators. In such systems, hydraulic fluid is mechanically valved to receiprocate a reaction mass member to generate seismic waves. Such a hydraulically actuated system is disclosed and described in U.S. Pat. 3,306,391, issued Feb. 28, 1967. Such systems are relatively complex, and usually provide very low percentages of the total system output power below and above a relatively narrow frequency band within the band of frequencies of seismic interest.

Furthermore, relatively expensive servo valves, close fitting piston rings and packing glands for pressure seals are required for these hydraulic systems. These parts not only increase the initial manufacturing costs of the hydraulic systems, but inherently create operational and maintenance problems which are difficult for a seismic crew to correct in the field. Conventional hydraulic actuated seismic wave generators also require very expensive dirt filters in order to maintain the hydraulic systems free of dirt larger than a few microns.

An additional disadvantage which has heretofore plagued conventional hydraulic seismic wave generators is the introduction of a phase shift into the output seismic waves. This phase shift is due to a variety of factors, including the presence of the servo valves, cylinder pistons and rings with their individual friction losses, in addition to the mass inertias of the various moving parts. This delay in the response of prior systems to a change in the command signal has presented problems necessitating complex control circuitry when it is desired to hold a plurality of parallel wave generators in phase.

In accordance with the present invention, fluid is provided which exhibits viscosity variations upon the application of an electrostatic field. System structures form flow paths for the fluid leading to a generator which generates seismic waves when reciprocated. Electric-field valves disposed in the flow paths selectively vary the passage of the fluid to the seismic generator by the application of electrostatic fields.

For a more complete understanding of the present invention and for further objects and advantages thereof, reference may now be had to the following description taken in conjunction with the accompanying drawings in which.

Figure 1:
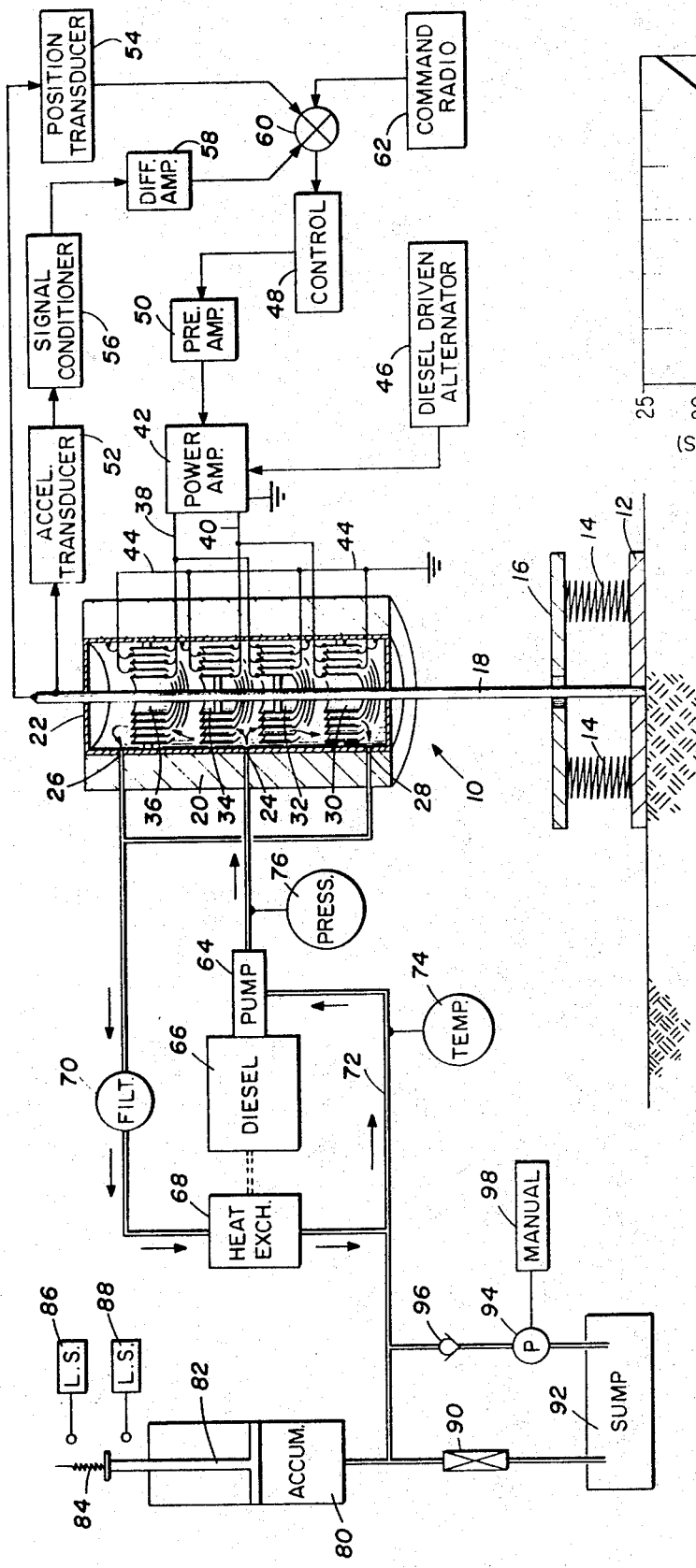
FIG. 1 is a schematic diagram of a land-based seismic wave generator according to the invention.

Referring to FIG. 1, a seismic wave generation system for land-based seismic exploration is illustrated. The generator mechanism is illustrated generally by the numeral 10 and comprises a ground pad 12 which is adapted to be held in contact with the earth by the force of spring members 14 biased against a lift plate 16. The entire system will ordinarily be mounted to the frame of a truck or the like, and the weight of the truck is generally pressed against the plate 16 in order to hold the generator mechanism securely to the earth. A rod 18 provides reciprocation to the ground pad 12 in order to impart seismic vibrations into the earth. Various combinations of lift plate and ground pad assemblies suitable for use with the invention are known in the art, with an exemplary mechanism being described and disclosed in U.S. Pat. 3,306,391, issued Feb. 28, 1967.

The reciprocating power source of the present invention is surrounded by a reaction mass 20 and comprises a cylinder 22 having a fluid inlet port 24 and fluid outlet ports 26 and 28. Four electric valves 30, 32, 34 and 36 each comprising a plurality of spaced apart concentric cylinders, are disposed inside the cylinder 22, with valves 30 and 36 being fixedly attached to the inner walls of the cylinder 22 and valve members 32 and 34 being fixedly attached to the rod 18. Each of the valves 30–36 comprises a number of concentric, spaced apart cylinders across which an electric field may be applied. As will be later described, selective application of electrostatic forces act upon fluid supplied to the cylinder 22 in order to vary the viscosity of the fluid and cause reciprocation of the rod 18 with respect to the reaction mass 20.

The electric fields are applied across the concentric cylinders of the valves through control signal lines 38 and 40 from a power amplifier 42. A first variable control voltage, which may be sinusoidal, is impressed upon alternate ones of the concentric cylinders of the valves 32 and 36 through a diode (not shown) in the power amplifier 42 and through the line 38. These alternate ones of the concentric cylinders are electrically isolated from the rod 18 and cylinder 22. The remaining concentric cylinders of the valves 32 and 36 are electrically connected to the walls of the cylinder 22 and to ground through lead 44. A second variable control voltage of the same amplitude and frequency as the first voltage, but 180° out of phase with the first voltage, is impressed across alternate ones of the concentric cylinders of the valves 30 and 34 through a diode (not shown) in the power amplifier 42 and through the lead 40. These alternate ones of the concentric cylinders of valves 30 and 34 are electrically isolated from the rod 18 and cylinder 22. The remaining concentric cylinders of the valves 30 and 34 are connected to ground through the lead 44 and also to the wall of the cylinder 22. The diodes eliminate negative portions of the sinusoidal signals and hence only alternate positive pulses appear on leads 38 and 40. Valve pairs 32 and 36, and 30 and 34 are thus alternatively energized, and reciprocation of the rod 18 will occur and conform to the amplitude, character and frequency of the control signals.

The electric-valve motor described operates on the well-known Winslow effect and may comprise, for instance, the exciter manufactured and sold under the trademark Electro-Fluid Exciter by The Rucker Company, Controlled Systems Division, 4700 San Pablo Ave., Oakland, Calif. Such exciters have heretofore been utilized as high frequency shaker table power sources, but have not been used as low frequency motors for operating seismic wave generators.

Power is provided to the power amplifier 42 from a diesel driven alternator 46. The frequency and amplitude of the control signals are determined by a control circuit 48, which may comprise oscillator circuitry. The output of circuit 48 is amplified by the preamplifier 50 and fed into the power amplifier 42 for application to the electric valves 30–36.

The output of the control circuit 48 may be continuously controlled in response to the reciprocation of the rod 18 by the outputs of an accelerometer transducer 52 and a position sensing transducer 54. The output of the accelerometer transducer 52 is conditioned by a circuit 56 and fed through a differential amplifier 58 into an adder circuit 60, wherein it is combined with the output of the position transducer 54. If the transducer outputs supplied to the summing circuit 60 substantially vary due to changing earth characteristics or the like, an error signal is provided to the control circuit 48 to change the amplitude or frequency of the control signal to compensate for the variances.

If desired, commands may be supplied from a radio circuit 62 in order to change the magnitude or frequency of the seismic vibration imparted by the generator 10 by varying the control signal. For instance, it is sometimes desirable to increase the output level of seismic generators at higher frequencies in order to provide better definition of stratographic trap exploration. The output of the present seismic wave generator may then be manually varied, or may be automatically varied in accordance with a predetermined program. In some instances, detectors may be spaced some distance from the wave generator to provide outputs representative of the waves which pass through the earth. The control signals supplied to the wave generator may then be varied until the input and the output of the generator are suitably matched. Due to the small phase shift in the operating passband of interest in the electric field valve motor, changes may be very rapidly and accurately made. The lack of substantial phase shift also allows a plurality of wave generators to be efficiently operated in parallel.

Fluid sensitive to electrostatic fields is forced at constant volume through the inlet 24 by a pump 64. This fluid may for instance comprise an oil containing certain selected additives. Pump 64 is driven by a diesel motor 66, which also operates a heat exchanger 68 for cooling the fluid exhausted through the outlet ports 26 and 28. A filter 70 is provided in the return flow path of the fluid in order to filter out excessively large impurity particles. Filter 70 is not generally required to filter particles smaller than about 250 microns, which is in striking contrast to the precise filtering characteristics required by previously developed hydraulically actuated vibrator systems, wherein no particles larger than several microns can be allowed in the system. The performance of the present system actually often improves with the addition of some impurities to the fluid, a characteristic most advantageous for systems used in the field.

After the fluid passes through the heat exchanger 68, the fluid is recycled through the conduit 72 to pump 64, where it is again pumped under pressure through the inlet port 24. A monitor 74 continuously measures the temperature of the fluid passing through the conduit 72, and may actuate controls to shut off operation of the system if the fluid temperature varies outside a predetermined range. Similarly, the monitor 76 continuously measures the pressure of the fluid at the output of the pump 64, and actuates switches to cut off the system in case of excessively high or low fluid pressures.

An accumulator 80 maintains the predetermined level of the fluid in the system and guarantees a positive pressure on the pump. A piston 82 is loaded by spring 84. Limit switches 86 and 88 sense extreme positions of the piston 82. If the limit switch 86 is actuated, an excessive amount of fluid is presently in the system, and a high limit switch 90 is actuated in order to allow the excess fluid to drain into a sump 92. If the limit switch 88 is actuated, additional fluid is required in the system, and a pump 94 is actuated to pump additional fluid from the sump 92 into the system. A check valve 96 is provided to prevent fluid from normally draining through the pump 94 to the sump 92. If desired, pump 94 may be manually actuated by a manual control 98.

In operation, diesel 66 is actuated to drive pump 64 in order to provide a supply of fluid into the cylinder 22 through the inlet port 24. When the electric valves 30–36 are in an unexcited state, the fluid divides equally and flows in equal amounts through the valves to the exhaust ports 26 and 28, and then combines to flow into the heat exchanger 68 for recirculation.

When the control circuit 48 is energized, control signals out of phase with one another are amplified by the amplifiers 50 and 42, rectified by the diodes in amplifier 42, and impressed across the lines 38 and 40. Valve pairs 30 and 34, and 32 and 36, are alternatively energized by the positive control signals. When valves 30 and 34 are energized and valves 32 and 36 are de-energized, flow of the fluid through valve members 30 and 34 is blocked and pressure is developed in the portion of the cylinder between valves 30 and 34. The fluid pressure exerted on the face of the valve 34 causes the rod 18 to move upwardly. To produce reciprocation of the rod 18, the control signals de-energize valves 30 and 34 and energize valves 32 and 36. The fluid pressure exerted on the face of the valve 32 then causes a downward movement of the rod 18.

Figure 2:
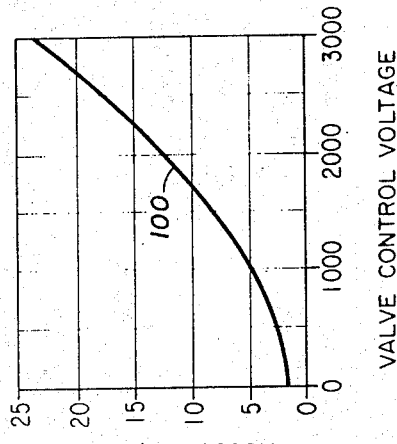
FIG. 2 is a graph illustrating the change of viscosity of the fluid utilized in the invention in the presence of varying control voltages.

FIG. 2 illustrates the phenomena utilized by the present invention to selectively energize the valves in the cylinder 22. FIG. 2 illustrates a constant fluid flow through an electric valve similar to those shown in FIG. 1, while the magnitude of the control voltage on the valve is varied between zero and 3000 volts. As is apparent from curve 100 of the graph, the equivalent viscosity of the fluid greatly increases as the control voltage amplitude is increased. This increase in viscosity of the fluid substantially stops flow of the fluid through the valve.

Figure 3:
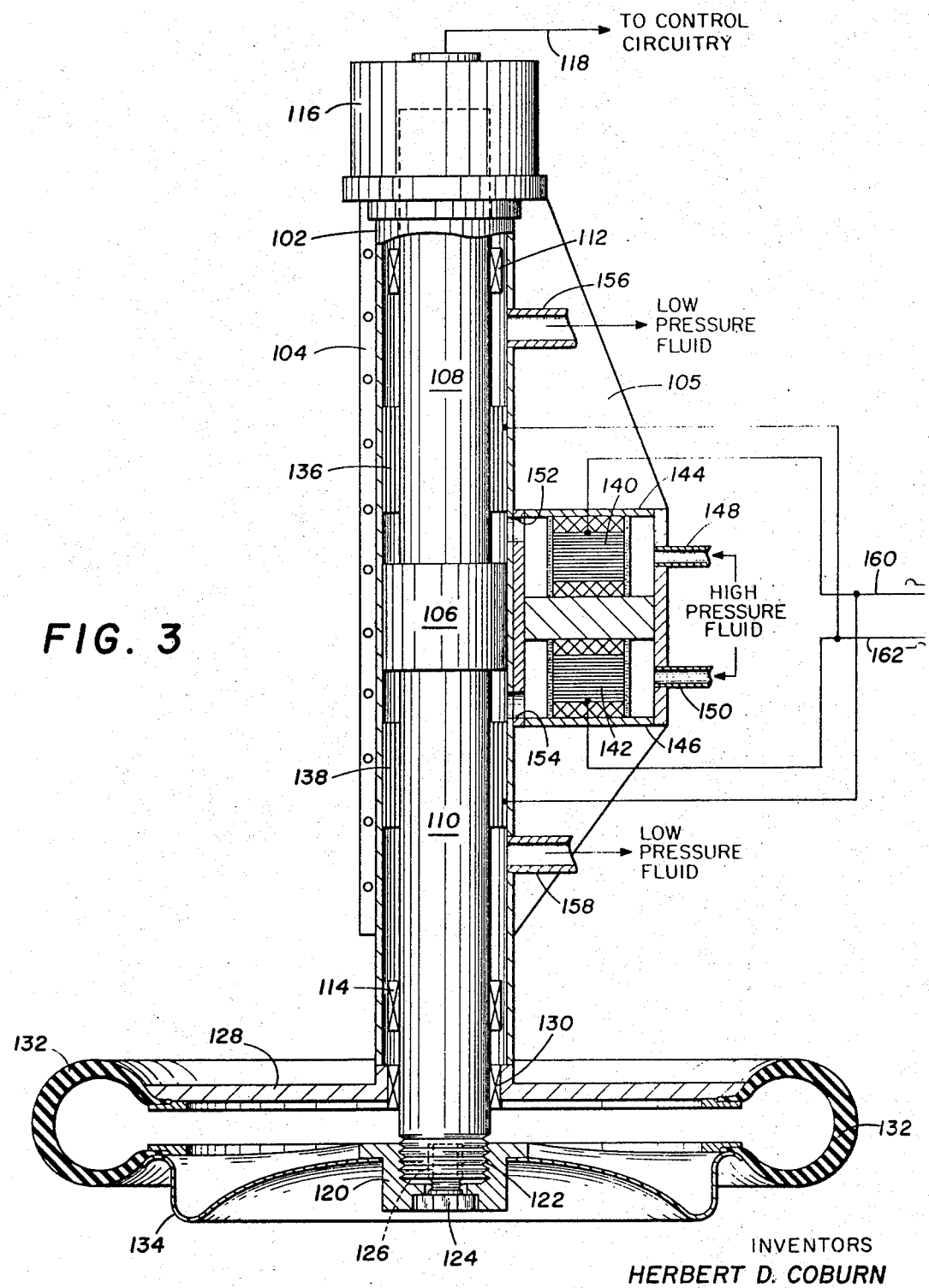
FIG. 3 is a somewhat diagrammatic sectional view of a marine seismic wave generator according to the invention.

Referring to FIG. 3, another embodiment of the invention is illustrated for generation of sesimic waves in a marine environment. Whereas the seismic wave generator illustrated in FIG. 1 contained four electric valves inside the actuation cylinder, the embodiment shown in FIG. 3 contains two electric valves inside the cylinder in combination with two electric valves disposed outside the cylinder. The wave generator in FIG. 3 comprises an elongated cylinder designated generally by numeral 102 and including a towing flange 104 along the length thereof for attachment to a marine vessel. Guide fins 105 are connected to the cylinder 102 to facilitate towing of the generator. A piston 106 is slidably disposed in cylinder 102 and includes a pair of rods 108 and 110 extending on opposite sides thereof. Rod 108 is sealingly received by bearings 112 and rod 110 is sealingly received by bearing 114 in order that the rod and piston assembly may be freely reciprocated within cylinder 102.

Accelerometer and position transducers (not shown) are disposed inside a cap member 116 connected to one end of the cylinder 102 to provide output signals via lead 118 which are representative of the acceleration and relative position of the rod 108. The lower end of the rod 110 is rigidly connected to a member 120 by lefthand threads 122 and by a bolt 124 having righthand threads 126.

An annular plate 128 is rigidly connected to the lower part of cylinder 102 and supports a bearing 130 to allow sliding movement of the rod 110. A flexible annular tube 132 is attached around the outer edge of the plate 128 and is also attached to a diaphragm member 134. Member 134 is connected at its center to the member 120. This lower assembly comprises an underwater transducer, wherein reciprocation of the rod 110 causes movement between the annular plate 128 and the diaphragm 134 to create underwater seismic waves.

A pair of annular electric valves 136 and 138 are connected to the inside of the cylinder 102 on opposite sides of the piston 106. A second pair of electric valves 140 and 142 are disposed outboard of the cylinder 102 in chambers 144 and 146. Valves 140 and 142 comprise a plurality of spaced plates having electrical connections for receiving electric charges. High pressure electrostatically sensitive fluid is supplied to the chambers 144 and 146 via conduits 148 and 150. Outlet ports 152 and 154 respectively provide communication between the chambers and the cylinder 102 on opposite sides of the piston 106. Outlet ports 156 and 158 allow exhausting of the low pressure fluid from the cylinder 102 to a suitable sump (not shown). Exhausting could alternatively be accomplished through passages through the rods 108 and 110 and the piston 106 to a common sump return port and line. Such a return port would also provide snubbing action in case of mechanical malfunction.

Electrical control signals having different phases are supplied to the electric valves via lines 160 and 162 from a suitable source in the manner shown in FIG. 1. The signals appearing on line 160 control the operation of electric valves 138 and 140, while the signals appearing on lead 162 control the operation of electric valves 136 and 142.

In operation, a voltage applied on line 160 will energize electric valves 138 and 140 due to the well known Winslow effect, thereby preventing the flow of fluid through the valves. The fluid under pressure applied through valve 142 then passes through port 154 and acts upon the lower face of the piston 106 in order to move rod 110 upwardly. Low pressure fluid is exhausted through conduit 156. When an energizing signal is alternately applied to line 162, electric valves 138 and 140 are opened, while electric valves 136 and 142 are closed. Fluid under pressure then passes through valve 140 and port 152 to act upon the piston 106 and cause the rod 110 to move downwardly. Low pressure fluid is exhausted through conduit 158. Continuous reciprocation of the rod 110 causes continuous motion between the annular plate 128 and the diaphragm 134, thereby causing the emission of seismic waves at the frequency of reciprocation of the generator.

Figure 4:
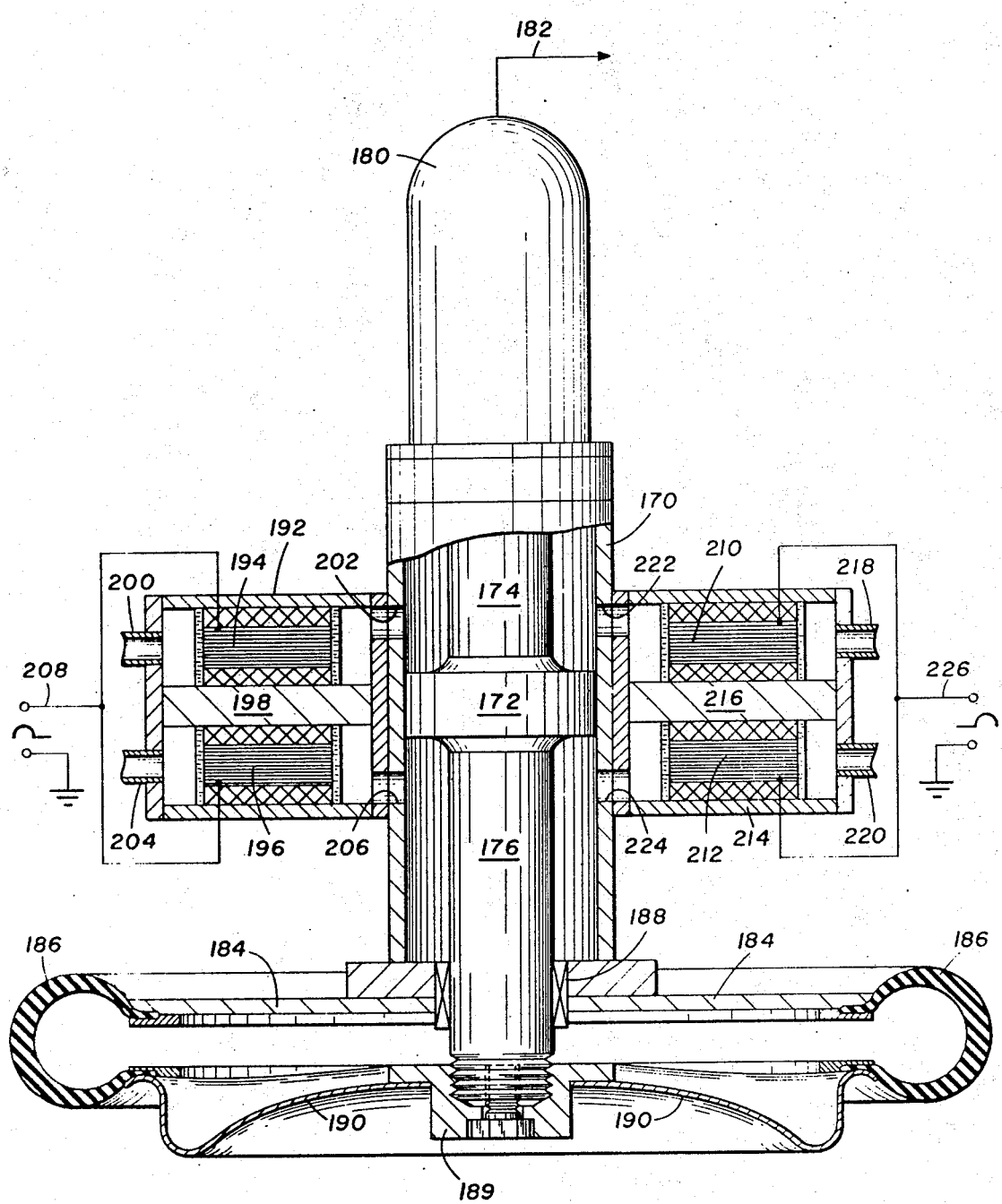
FIG. 4 is a diagrammatic view, partially in section, of another embodiment of a marine seismic wave generator.

FIG. 4 illustrates another embodiment of the invention comprising a marine seismic wave generator having four electric valves mounted outboard of the actuation cylinder. The generator comprises a cylinder designated generally by numeral 170 and having mounted therein a piston 172 and rods 174 and 176. Piston 172 is sealingly received by the walls of the cylinder 170. Sensing circuitry (not shown) is contained within a housing 180 connected to the top of the cylinder 170 for providing information on lines 182 concerning the acceleration and position of the rod 174.

An annular plate 184 is rigidly connected to the cylinder 170 and supports about its outer periphery an inner surface of the resilient annular tube 186. The lower end of the rod 176 is slidably mounted in a bearing 188 and is threadedly connected at the bottom thereof to a connection member 189. Member 189 supports the center portion of a diaphragm 190. The outer periphery of the diaphragm 190 is connected to the resilient member 186.

A chamber 192 contains a pair of electric valves 194 and 196 which are separated by a wall 198. A conduit 200 communicates with a sump (not shown) to receive electrically sensitive fluid exhausted from the cylinder 170 through a port 202. A conduit 204 is connected to a source of high pressure electrically sensitive fluid (not shown). A port 206 communicates with the cylinder 170 to provide an inlet for high pressure fluid. An electric control signal is simultaneously applied to both the electric valves 194 and 196 via lead 208. A second pair of electric valves 210 and 212 are contained in a chamber 214 and are separated by wall 216. A conduit 218 is connected to a source of high pressure fluid (not shown), while a conduit 220 is connected to a sump (not shown) to receive exhausted fluid from the cylinder 170. Ports 222 and 224, respectively, provide communication between the electric valves and the cylinder 170 on opposite sides of the piston 172. A second electrical control signal is applied to the valves 210 and 212 via lead 226, the second control signal having a phase different from the phase of the control signal applied to the electric valves 194 and 196.

In operation, valves 194 and 196 are de-energized, while valves 210 and 212 are energized to prevent flow of fluid therethrough. Fluid under pressure then flows through conduit 204, valve 196 and through port 206 in order to drive the piston 172 upwardly. Low pressure fluid is exhausted through port 202, electric valve 194 and conduit 200. To cause reciprocation of the piston 172, valves 194 and 196 are energized, while valves 210 and 212 are de-energized. Fluid under pressure then flows through conduit 218, electric valve 210 and port 222 in order to force piston 172 downwardly. Low pressure fluid is exhausted via port 224, electric valve 212 and conduit 220. Reciprocation of the piston 172 causes movement between the annular plate 184 and the diaphragm 190, thereby imparting seismic waves to the water surrounding the generator.

Figure 5:
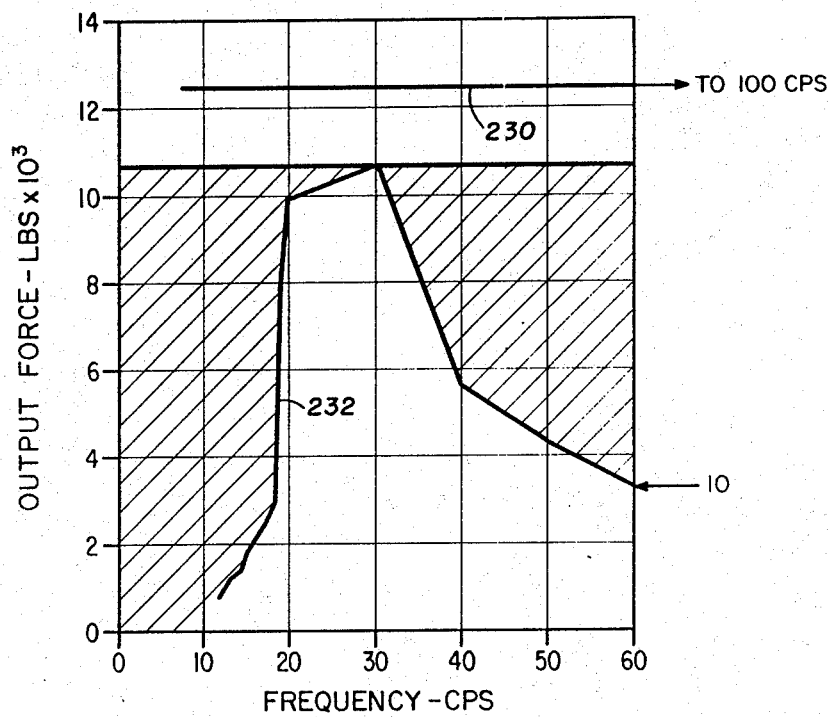
FIGS. 5 and 6 are graphs illustrating various aspects of the performance of the present invention compared to prior art devices.

Referring to FIG. 5, the performance of the present seismic wave generator is compared with the performance of conventional hydraulically actuated seismic generator systems. Curve 230 illustrates the substantially constant output force provided by the present invention across a bandwidth between 5 and 100 cycles per second. This constant frequency response is very advantageous for seismic work, as the signal input of the present system does not have to be varied as the frequency of operation changes in order to have a constant force output.

Curve 232 illustrates the output power characteristics of a conventional hydraulically actuated seismic generator. The output force level of this generator is a function of its servo valve and hydraulic component characteristics, and it may thus be seen that the peak force output occurs at about 30 cycles per second and decreases sharply below 20 cycles per second and above 40 cycles per second.

Figure 6:
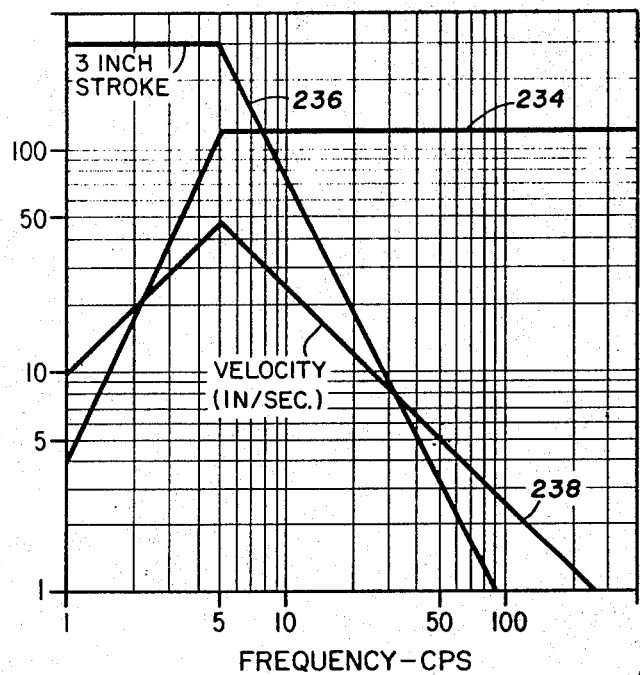

FIG. 6 illustrates performance characteristics of the present electric valve actuated seismic vibrator as a function of frequency. Curve 234 illustrates the constant output of 12,500 pounds of force of a generator constructed in accordance with the invention from 5 to over 100 cycles per second. Curves 236 and 238 illustrate the decreasing input power required to maintain the illustrated constant output force. Curve 236 shows the variance of the stroke of the present invention across the frequency range of 5 to 100 cycles per second. Line 238 illustrates the variation in velocity, in inches per second, of the present invention over the frequency range of 5 to 100 cycles per second.

It will be understood that the present invention provides innumerable advantages over previously developed seismic vibrators. Expensive, precision designed servo valves are not required by the present invention, and thus problems involving contamination by foreign material, maintenance, and limitations in operating power due to a servo valve are not incurred in the present invention.

Additionally, close fitting piston rings used to effect the seal between a cylinder wall and piston are not required in the present invention, due to the fact that the electric valves of the invention are integral parts of the power cylinder. The elimination of piston rings eliminates uneven wearing of the rings which causes high leakage, loss of power, and loss of phasing capability of a seismic vibrator. Further, packing gland design for sealing piston rods required by several embodiments of the invention is much simplified due to the low pressures involved on the exhaust side of the structure, and therefore shaft wear and leakage is substantially eliminated.

The present invention is essentially contamination proof, as contrasted with the prior art devices which require very expensive filters to eliminate particles exceeding a few microns in size. The present system provides a full force output over a very wide frequency range of operation, and the size of the output force is directly proportional to the amplitude of the input command signal. This characteristic of the performance of the present invention often eliminates the requirement of a plurality of prior art vibrators to perform a task.

The small phase shift of the present invention also provides many advantages over the prior art, as the present system's response to a change in command signal is not substantially delayed. This allows multiple actuators constructed in accordance with the present invention to be connected in parallel and easily held in phase with simple feedback systems.

The present system may also be operated by a diesel power source having lower horsepower capabilities than the engines required to power conventional hydraulic seismic vibrators. For prior art hydraulic systems to operate at very high flow rate, the pressure in the systems must be pushed to very high levels, thereby creating hazards in operation in case of component failure. The present invention is not so limited, due to the elimination of the servo valve, and therefore the present system may be operated at very high flow rates while maintaining relatively low operating pressures, resulting in much higher output power capabilities.

Additionally, the present system operates generally as a closed system, and does not take fluid from or return fluid to a large reservoir or storage well. The fluid in the present invention is continuously flowed at all times, and therefore the power response of the system is generally instantaneous due to the fact that the fluid is already in motion. The present invention is extremely simple in design and operation, therefore making for more trouble-free operation and ease of maintenance.

What is claimed is:
1. A seismic wave generator system comprising:
  (a) a source of fluid which fluid exhibits viscosity variations upon the application of an electric field,
  (b) structure forming flow paths for said fluid,
  (c) valve means disposed in said structure forming flow paths for selectively controlling the passage of fluid through said flow paths by the application of electric fields to the fluid, and
  (d) seismic generator means adapted to be reciprocated by the hydrodynamic energy of said fluid at a rate to generate seismic waves.
2. The system according to claim 1 wherein said seismic generator means comprises:
  (a) a cylinder formed by said flow path structure
  (b) piston means reciprocated within said cylinder by the hydrodynamic enregy of said fluid,
  (c) a rod connected to said piston means and extending from said cylinder, and
  (d) means connected to one end of said rod for generating seismic waves when reciprocated.
3. The system according to claim 2 wherein said means connected to one end of said rod comprises a plate for imparting vibrations to the earth to generate seismic waves.
4. The system according to claim 2 wherein said means connected to one end of said rod comprises diaphragm means suitable for generation of underwater acoustic signals.
5. The system according to claim 2 wherein said valve means are disposed outside said cylinder.
6. A system for reciprocating a transducer to generate seismic signals comprising:
  (a) a source of pressurized fluid which fluid exhibits viscosity variations in the presence of an electric field across said flow paths to direct the flow of said fluid against one portion of said transducer.
  (b) structure forming flow paths for said fluid leading from said source to said transducer.
  (c) first circuit means for applying an electric field across said flow paths to direct the flow of said fluid against one portion of said transducer,
  (d) second circuit means for applying an electric field across said flow paths to direct the hydrodynamic energy of said fluid against another portion of said transducer, and
  (e) means for alternately energizing said first and second circuit means to cause generation of seismic signals due to the resulting reciprocation of said transducer.
7. The system of claim 6 wherein said means for alternately energizing said circuit means comprises a source of alternating voltage.
8. The system of claim 6 further comprising:
sensor means for providing outputs representative of characteristics of the position and movement of said transducer, and
circuit means responsive to said outputs for controlling the operation of said source of alternating voltage.
9. A seismic signal generation system comprising:
  (a) a seismic transducer which radiates seismic signals when reciprocated,
  (b) an electric-field fluid motor operable due to the Winslow effect on fluid said motor being connected to reciprocate said transducer, and
  (c) circuit means for controlling the operation of said electric-field fluid motor.
10. A seismic vibrator comprising:
  (a) a source of fluid which fluid exhibits viscosity variations in the presence of an electrostatic field,

(b) pump means for pumping said fluid under constant pressure, (c) a cylinder having conduit means for receiving said fluid from said pump means and for exhausting said fluid back to said pump means, (d) electric valve means connected between portions of said conduit means for selectively applying electric fields to said fluid to change the flow of said fluid, (e) means disposed in said cylinder adapted to be reciprocally driven in response to the fluid flow variations, and (f) seismic transducer means operated by said driven means to generate seismic vibrations.

11. A method of controlling an electrostatically responsive fluid to drive a seismic wave generator comprising:

(a) flowing said fluid in a closed system to said seismic impulse generator, (b) sequentially imposing electrostatic forces across portions of said fluid to vary the path of fluid flow to drive said seismic wave generator, (c) sensing the output of said seismic wave generator, and (d) controlling the application of said electrostatic forces to said fluid in response to said output.

12. The method of generating seismic waves comprising:

(a) directing electrostatically responsive fluid against a reaction surface of a piston member connected to a seismic generator, (b) applying electrostatic forces across said fluid to vary the viscosity thereof and to direct said fluid against another reaction surface of said piston member, and (c) maintaining sufficient pressure on said fluid to cause reciprocation of said piston member and operation of said seismic generator in response to the variances of viscosity thereof.

13. A seismic wave generator system comprising:

(a) a cource of fluid which fluid exhibits viscosity variations upon the application of an electrostatic field, (b) structure forming flow paths for the fluid, (c) a cylinder communicating with said structure forming flow paths, (d) control valve means disposed within said cylinder for selectively controlling the passage of fluid through said cylinder by the application of electrostatic fields to the fluid, (e) piston means reciprocated within said cylinder by the action of the fluid, (f) a rod connected to said piston means and extending from said cylinder, and (g) means connected to one end of said rod for generating seismic waves when reciprocated.

References Cited

UNITED STATES PATENTS

| | | | |
|---|---|---|---|
| 2,651,258 | 9/1953 | Pierce | 137—251 X |
| 2,661,596 | 12/1953 | Winslow | 60—52 |
| 2,692,582 | 10/1954 | Curci et al. | 137—251 X |
| 2,743,898 | 5/1956 | King | 251—139 |
| 3,282,372 | 11/1966 | Brown et al. | |
| 3,329,930 | 7/1967 | Cole et al. | |
| 3,405,728 | 10/1968 | Dexter | 137—251 |

BENJAMIN A. BORCHELT, Primary Examiner

T. H. WEBB, Assistant Examiner

U.S. Cl. X.R.

340—17; 137—251; 60—52